United States Patent [19]
Lewin et al.

[11] Patent Number: 6,013,386
[45] Date of Patent: Jan. 11, 2000

[54] SOLID OXIDE FUEL CELLS WITH SPECIFIC ELECTRODE LAYERS

[75] Inventors: Robert Glyn Lewin; Stephen Vernon Barnett; Geoffrey Alan Wood, all of Preston, United Kingdom

[73] Assignee: British Nuclear Fuels PLC, Cheshire, United Kingdom

[21] Appl. No.: 08/913,729

[22] PCT Filed: Mar. 18, 1996

[86] PCT No.: PCT/GB96/00639

§ 371 Date: Jan. 19, 1998

§ 102(e) Date: Jan. 19, 1998

[87] PCT Pub. No.: WO96/28856

PCT Pub. Date: Sep. 19, 1996

[30] Foreign Application Priority Data

Mar. 16, 1995 [GB] United Kingdom .................... 9505301
Feb. 5, 1996 [GB] United Kingdom .................... 9602284

[51] Int. Cl.$^7$ ...................................... H01M 8/10
[52] U.S. Cl. ................... 429/30; 429/32; 429/41; 429/33
[58] Field of Search ................... 429/30, 31, 32, 429/33, 40, 41, 44

[56] References Cited

U.S. PATENT DOCUMENTS

| 4,052,532 | 10/1977 | Tannenberger et al. ................ 429/33 |
| 4,142,024 | 2/1979 | Van den Berghe et al. .............. 429/41 |
| 4,354,912 | 10/1982 | Friese ................................ 204/195 |
| 4,692,274 | 9/1987 | Isenberg et al. .................... 252/521 |
| 4,702,971 | 10/1987 | Isenberg ............................ 429/33 |
| 5,064,733 | 11/1991 | Krist et al. ........................ 429/17 |
| 5,445,903 | 8/1995 | Cable et al. ........................ 429/33 |

FOREIGN PATENT DOCUMENTS

| 0 253 459 A2 | 5/1986 | European Pat. Off. . |
| 0 524 013 A1 | 7/1991 | European Pat. Off. . |
| 39 22 673 A1 | 7/1989 | Germany . |
| 5062688 | 9/1991 | Japan . |
| 4230955 | 8/1992 | Japan . |
| 1379277 | 6/1971 | United Kingdom . |
| 1 500 558 | 11/1974 | United Kingdom . |
| 2 272 328 | 11/1992 | United Kingdom . |
| WO 93/02481 | 7/1991 | WIPO . |
| WO 93/26055 | 6/1992 | WIPO . |

OTHER PUBLICATIONS

Wang, L.S., and Barnett, S.A., Lowering the Air–Electrode Interfacial Resistance in Medium–Temperature Solid Oxide Fuel Cells, Journal of the Electrochemical Society, Oct. 1992, vol. 139, No. 10, Manchester, NH, pp. L89–L91.

Primary Examiner—Bruce F. Bell
Attorney, Agent, or Firm—Workman, Nydegger & Seeley

[57] ABSTRACT

A solid oxide fuel cell and method of production are provided. The cell may have a layer of electrolyte material and a first and second electrode on either side thereof. The electrodes are separated from electrolyte by separator layers which are a mixed conductor. The fuel sell may be used in a stack.

17 Claims, 3 Drawing Sheets

SOLID OXIDE FUEL CELLS WITH SPECIFIC ELECTRODE LAYERS

BACKGROUND OF THE INVENTION

1. Field of the Invention

The present invention relates to fuel cells in particular to solid oxide fuel cells.

2. Present State of the Art

Fuel cells are electrochemical devices that convert chemical energy obtained from the reactants into electrical energy. A number of different families of such devices have been developed in the prior art. These vary according to the type of electrolyte used in the cell and the usual temperature of operation. All of the devices consume fuel at the anode or negative electrode and consume an oxidant at the cathode or positive electrode. Solid oxide fuel cells are commonly known and conventionally comprise an industry standard electrolyte tile having in close electrical contact an anode and a cathode.

In most known SOFCs the electrolyte is contained between an anode and a cathode and the anode and cathode of adjacent cells in a stack are connected by an interconnect or bipolar plate which permits electronic conduction between cells and allows reactant gases to be delivered separately to regions adjacent to the anode and cathode. The reactant gases will generally comprise oxygen usually supplied as air as oxidant and hydrogen or a hydrogen containing compound, e.g. hydrocarbon such as methane, as fuel. The interconnect or bipolar plate or a part thereof needs to be gas impervious to keep the reactant gases separate as well as electrically conducting to permit transport of electrons to and from the electrode surfaces to facilitate the electrochemical processes.

These conventional SOFCs, however, face a number of problems being uneconomical, costly or inefficient in their various forms.

Attempts have been made to overcome these problems and to improve the performance of the SOFCs. The efficiency can be increased but this has involved increasing the operating temperature to around 1000° C. Such high temperatures limit the varieties of materials it is possible to use in the construction of cells and associated support structure. Expensive exotic materials are necessary to withstand the operating conditions. Additionally the working life of the cell may be reduced.

Other alternatives have been to reduce the thickness of the electrolyte because it is thought that this will lower the cell resistance. Thin electrolytes, however, require additional strengthening through a support medium or the cells are too fragile to be practicable. This again increases cost and may require exotic materials to be used to withstand the operating conditions.

OBJECTS AND BRIEF SUMMARY OF THE INVENTION

According to the present invention there is provided a solid oxide fuel cell which comprises a layer of electrolyte material, a layer of a first electrode material on one side of the layer of electrolyte material, a layer of a second electrode material on the other side of the layer of electrolyte material, at least one of the electrode materials being reactive with the electrolyte material, and a separator layer comprising a mixed conductor separating the said reactive electrode material from the electrolyte layer.

Mixed conductors in the context of the present invention are materials which will at least partially conduct both electrons and oxygen ions. Mixed conductor layers may conveniently be provided between each of the electrode materials and the electrolyte layer. In such case, the mixed conductor materials of the two layers may be different, but are preferably the same.

It has been realised that the electrode material from a conventional cell spaced from the electrolyte may principally provide a current collecting function (the current collector) with the mixed conductor material providing an electrode function (the electrode).

Desirably, the said separator/electrode material is a ceramic oxide material which is stable in an oxidising or reducing atmosphere depending on the gas delivered to the surface of the adjacent electrode/current collecting material. Desirably, the separator/electrode material is stable in both an oxidising atmosphere and a reducing atmosphere so that the same material may be used adjacent to both of the electrode/current collecting materials.

The preferred separator/electrode material for use in the SOFC according to the present invention is urania, $UO_2$. Preferably, the urania is doped with one or more other oxides to provide the aforementioned stability. The urania may for example be doped with yttria as stabiliser, preferably forming from 40 mol per cent to 60 mol per cent of the mixed oxide with urania.

The electrode material is preferably a mixed oxide conducting interlayer, most preferably it comprises urania and zirconia. Most preferably the urania is provided as solid solution with yttria.

The conducting interlayer may be produced from a suspension additionally comprising one or more of the following:—yttria stabilised zirconia; cod liver oil; polyvinyl butyral; polyethylene glycol; dibutyl phthalate; ethanol; terpineol.

The urania employed may comprise natural or depleted urania, i.e. containing a U235 content less than that of natural urania.

The thickness of the layer (or, where more than one, each of the layers) of the separator/electrode material is preferably less than 100 micrometers so that ionic conduction between the electrolyte material and the electrode/current collecting materials) separated by the separator/electrode material may be maintained.

The electrolyte material may comprise an ionically conducting matrix based upon $ZrO_2$ optionally doped with a stabiliser such as yttria.

The electrolyte may be provided as an electrolyte tile. It may be manufactured from yttria stabilised zirconia, preferably with 3–12% yttria, most preferably around 8%.

Alternatively, the electrolyte may be a tile which is manufactured using an aqueous suspension. This aqueous suspension may contain one or more of the following zirconia, binder and dispersant. Preferably one or more of polyvinyl alcohol (PVA), polyethylene glycol and a dispersant are provided in the suspension. Aptly there is between 35% and 60% of zirconia, and 35% and 60% of binder, such as 5% PVA by weight. The suspension may also include between 2% and 8% polyethylene glycol and between 1% and 5% dispersant. Preferably the suspension contains 100 g zirconia; 100 g of 5% PVA solution in water; 10 g polyethylene glycol and 5 g dispersant. Any other suitable electrolyte may be used.

The anode material/ (current collecting material) current collector, adjacent to which hydrogen is introduced, may comprise a mixed $NiO/ZrO_2$ system, most preferably in a cermet form.

The cathode material/ current collector, adjacent to which oxygen is introduced, may comprise a cobaltite oxide system, e.g. a mixed oxide typically comprising lanthanum, strontium and iron and/or manganese oxides as well as cobalt oxide.

Lanthanum strontium cobaltite (LSC) is a particularly preferred current collecting/electrode material for the cathode current collector. However, the current collectors may be any suitable electrically conducting oxide or perovskite.

The cathode is preferably provided with a doped lanthanum strontium cobaltite current collector, which provides enhanced electron and ion conductivity. LSC has not previously been a possibility due to the incompatibility between a zirconia electrolyte and the LSC. However, use of the separator/electrode material in the SOFC according to the present invention allows reaction between the electrolyte material and LSC materials to be avoided whilst beneficially allowing suitably efficient electrochemical conversion and ionic conduction to be maintained. Surprisingly, the current density output can be greater using a $ZrO_2$ based electrolyte material employed in conjunction with a cobaltite based electrode/current collecting material as cathode separated from the electrolyte material by a urania based separator/electrode material than by using a similar $ZrO_2$ based electrolyte material together with a less reactive lanthanum based electrode material comprising La Sr and Mn oxides as widely investigated in the prior art.

The LSC is preferably printed, most preferably screen printed onto the electrolyte tile.

The separator/electrode layers conveniently provide a two dimensional array of conducting sites to facilitate efficient conduction of ions formed in the electrochemical process (as described hereinafter) in operation of the SOFC according to the present invention.

Urania employed as the separator/electrode material can also provide a good match in thermal expansion properties between the electrolyte and electrode materials, e.g. the specific materials given in the embodiments described hereinafter.

According to a second aspect of the invention there is provided a method of producing a fuel cell comprising the steps of:

producing an electrolyte tile;

applying an electrode layer to the tile wherein the electrode layer comprises urania.

According to a third aspect of the invention there is provided a method of producing a fuel cell comprising the steps of:

producing an electrolyte tile;

applying an electrode layer to the tile; then applying a current collecting material to the electrode.

Preferably the electrode layer comprises urania.

Other options for the second and third aspects of the following include:

Preferably the electrode layer and current collecting material are applied to both sides of the electrolyte.

The electrolyte tile is preferably produced from a suspension of zirconia. Most preferably the suspension is an aqueous based one. The suspension preferably incorporates a binding agent and a dispersant. The binding agents are preferably polyvinyl alcohol and polyethylene glycol, but any other suitable binding agent may be used.

The dispersant agent may be soap solution, but any other suitable dispersant may be used. Preferably the zirconia is mixed with 5% PVA and then conveniently the remaining materials are added thereto. This mixture is preferably ball milled for several days. This mixture is then conveniently slab cast and allowed to dry naturally at an ambient temperature.

The electrode layer is preferably formed from an yttria urania zirconia suspension. The electrode layer preferably includes binding agents and solvents and these are preferably cod liver oil, polyvinyl; polyethylene glycol, dibutyl phthalate and ethanol. However other suitable binding agents and solvent combinations may be used. The mixture is preferably ball milled for 21 days and preferably the ethanol is allowed to evaporate for at least 24 hours. At that stage preferably terpineol is added and the mixture stirred. It is important to provide a stable non-separating ink from the $UO_2$.

The current collecting layer may be standard nickel/zirconia cermet for the anode and lanthanum strontium cobaltite or lanthanum strontium manganite for the cathode or any other suitable electrically conducting powder. The formulation of the current collecting layer is preferably standard screen printing ink. This is preferably in the case of the cathode produced by a suspension of doped LSC, methanol, polyvinyl pyrolydone. This mixture is preferably ball milled for 13 days and then preferably the methanol is allowed to evaporate for 24 hours and terpineol added thereto and the mixture stirred. The anode and the cathode current collectors are preferably screen printed onto the electrolyte tile.

According to a fourth aspect of the invention there is provided the use of a fuel cell according to the first aspect of the invention or which is produced according to the second or third aspect of the invention.

According to a fifth aspect of the invention there is provided a method of generating electrical current by means of a fuel cell according to a preceding aspect.

According to a sixth aspect of the invention there is provided a method for producing an electrolyte tile from an aqueous suspension.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENT

Figure 1:
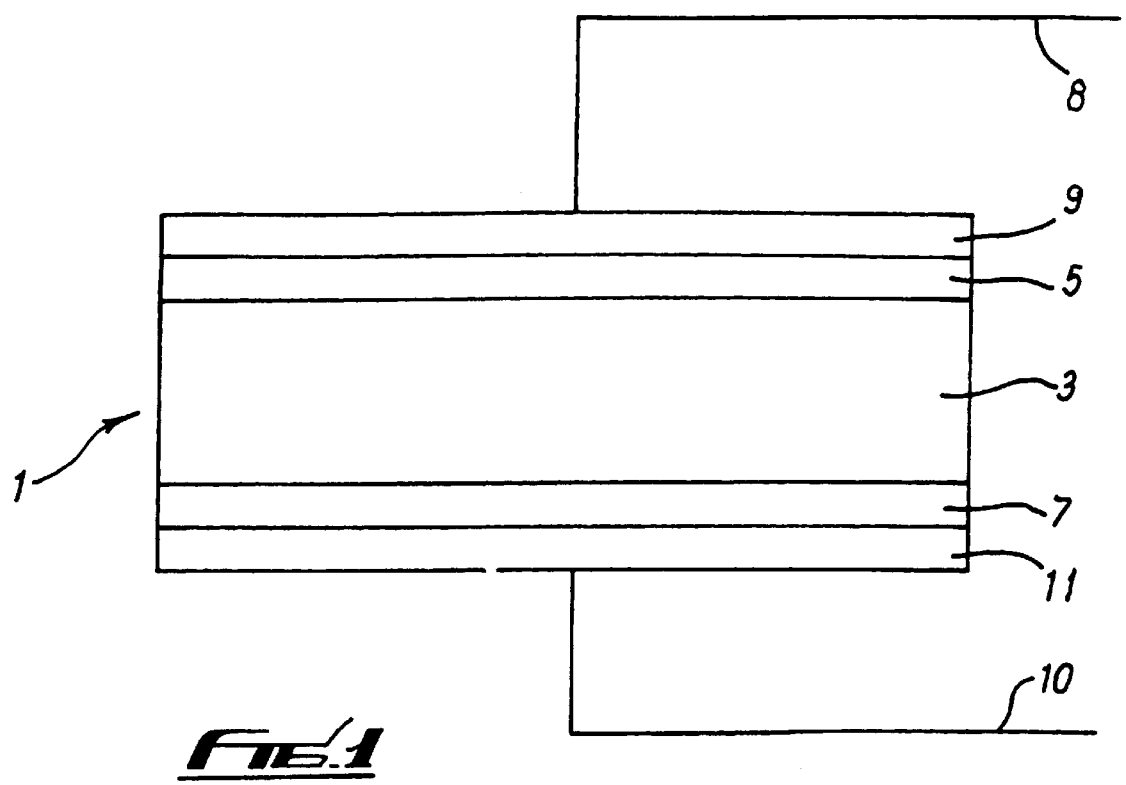
FIG. 1 is a side view of a SOFC.

FIG. 1 shows a SOFC 1 which has been formed by depositing other layers on a substrate electrolyte layer 3. A suitable substrate material for the electrolyte layer 3 is a platelet of sintered $Y_2O_3$ stabilised zirconia of known composition. The electrolyte layer 3 has separator layers 5, 7 deposited on its respective faces. The separator layers 5, 7 may be of depleted urania in a mixed oxide together with from 40 to 60 mol per cent yttria as stabiliser to provide protection in an oxidising atmosphere.

The separator layer 5 carries an anode layer 9, e.g. obtained from $NiO/ZrO_2$. The separator layer 7 carries a cathode layer 11, e.g. made of a known cobaltite composition containing typically oxides of La, Sr, Fe and/or Mn as well as Co.

The SOFC 1 shown in FIG. 1 may be assembled in a known way.

Oxygen, e.g. air is delivered in a known way to the region adjacent to the cathode layer 11 and diffuses through that layer to the separator layer 7. Oxygen atoms are reduced by electrons present in the separator layer 7. Negative oxygen ions formed in this process are transported through the separator layer 7 and then through electrolyte layer 3 to the separator layer 5. Hydrogen (e.g. obtained by reformation from a hydrocarbon) is delivered in a known way to the region adjacent to the anode layer 9. The hydrogen provides reduction of NiO present in the anode layer 9 to conducting Ni. Hydrogen is ionised at the interface between the separator layer 5 and the anode layer 9. The protons released at the layer 5 surface recombine with the oxygen ions from the separator layer 7. An electrical circuit may be completed by conductors 8, 10 connected respectively to the anode layer 9 and the cathode layer 11 and electrons formed by ionisation of hydrogen at the separator layer 5 may flow via the anode layer 9 and cathode layer 11 around the circuit when completed to provide an electron supply to continue the reduction process at the separator layer 7. The net effect is to provide a current flow through the external circuit.

Figure 2:
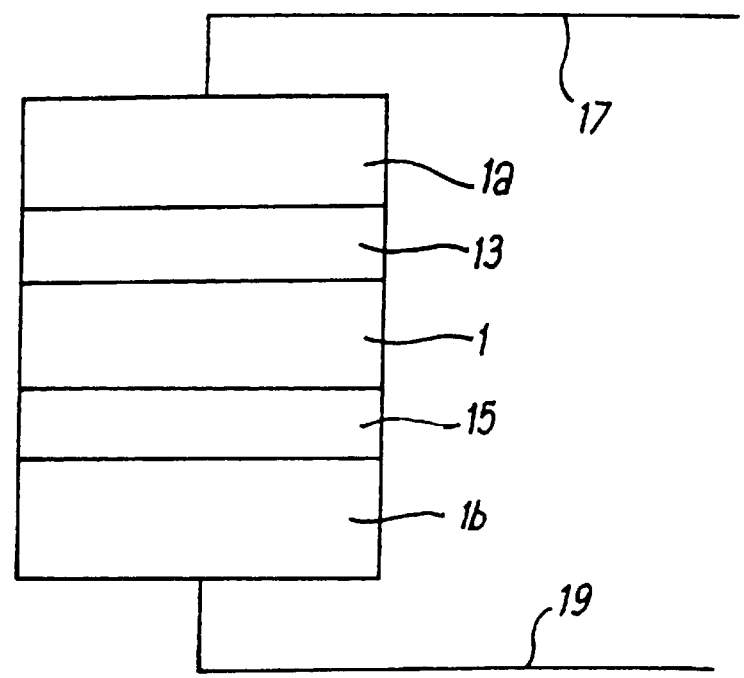
FIG. 2 is a side view of a series or stack of SOFCs of the kind shown in FIG. 1.

As shown in FIG. 2, a stack of SOFCs comprises the SOFC 1 of FIG. 1 (shown in outline only in FIG. 2) connected together in electrical series with further SOFCs 1a, 1b identical to the SOFC 1. The interconnection between the SOFCs 1 and 1a is formed by interconnect material 13 and the interconnection between the SOFCs 1 and 1b is formed by interconnect material 15. The material 13 and the material 15 may be identical. -The material 13 and 15 may comprise a known bipolar plate material or, alternatively, a layer of a conducting foamed or cellular material, e.g. comprising Ni alloy foam, through which the reactant gases $O_2$ and $H_2$, separated by a barrier layer, may conveniently be delivered. An output current may be extracted in an external circuit via conductors 17, 19 connected respectively to the anode layer of the SOFC 1a and the cathode layer of the SOFC 1b.

The output voltage provided by a series stack of SOFCs as shown in FIG. 1 is equal to the voltage provided by each SOFC multiplied by the number of SOFCs present. Therefore, the output power of the stack may be increased by increasing the number of SOFCs present in the stack.

Figure 3:
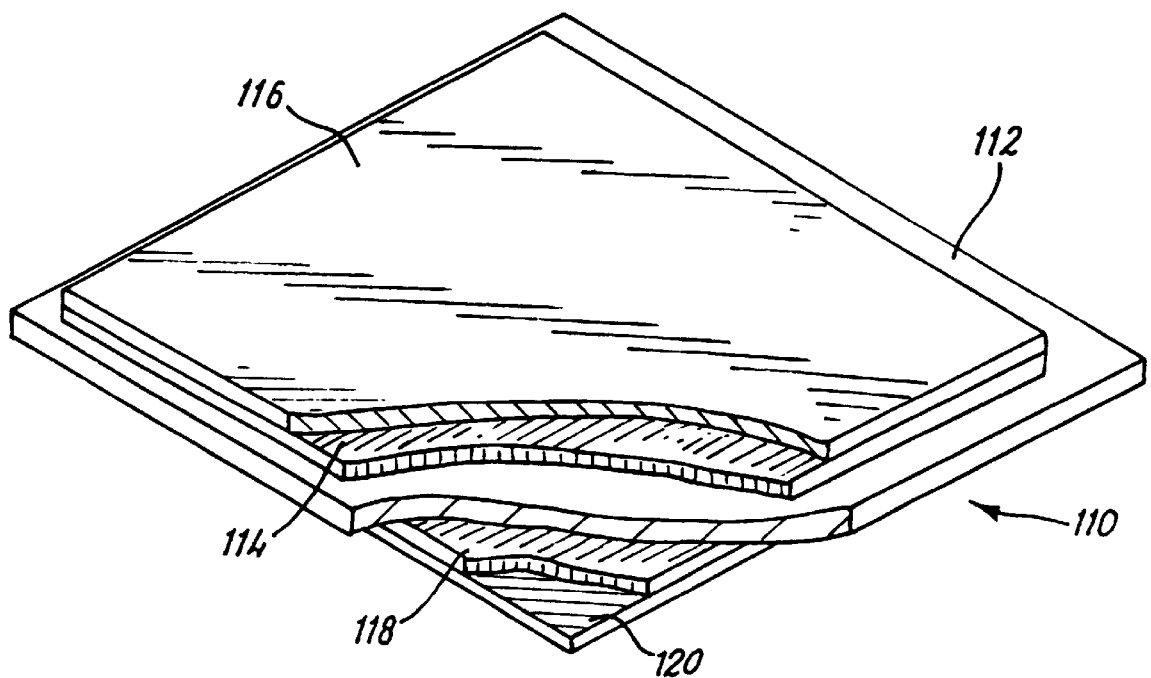
FIG. 3 is a partially sectioned perspective view of the first embodiment of the invention; invention.

The cell 110 shown in FIG. 3 consists of an electrolyte tile 112 which carries a mixed oxide electrode 114. The electrode 114 is in electrical contact with the tile 112. Mounted on the electrode 114 is an anode current collecting layer 116. This layer 116 is also in electrical contact with the electrode 114.

On the opposing side of the tile a further mixed oxide electrode 118 is provided with a cathode current collecting layer 120 mounted upon it.

The electrolyte tile is initially produced by slab casting to the desired shape and thickness. The tile 112 is cast from an aqueous suspension comprising 100 g zirconia : 100 g 5% polyvinyl alcohol (MW up to 185,000) solution in water: 10 g polyethylene glycol (MW up to 1,500) : 5 g dispersant. Laboratory style soap solution provides a suitable dispersant although others could be used.

The suspension is made by mixing the zirconia and polyvinyl alcohol together with the other materials then being added. The mixture is then ball milled for several days.

The suspension is placed in the cast and allowed to dry naturally at ambient temperatures then sintered at a temperature not greater than 1550° C. The tile 112 so produced can then be used in the subsequent production stages.

Other binders than PVA may be used. Equally other electrolyte base materials including zirconia doped with other rare earth metals can be used. Organic solvents are employed in prior art tile production.

The mixed oxide electrode 114 is produced from a stable ink suspension. The suspension is produced by mixing 17.19 g of 50 mol % yttria $UO_2$ solid solution, 13.65 g zirconia, 0.81 g cod liver oil, 4.5 g polyvinyl butyral, 1.33 g polyethylene glycol, 1.2 g dibutyl phthalate, 36 g ethanol in a ball mill for 21 days. The ethanol is then allowed to evaporate from the suspension for 24 hours. 20 g terpineol is then added and stirred in.

The resulting suspension is screen printed onto the preformed tile 112 to the desired depth. The mixed oxide electrode layer 114 is allowed to dry at ambient temperatures and the process is repeated for the other side of the tile 112. The mixed oxide layer 114 is then sintered at temperatures not greater than 1550° C.

The electrode layer 114, 118 offers significant advantages in terms of its stability under oxidising and reducing conditions. Its thermal expansion coefficient is also compatible with that of the 8 mol % yittria zirconia tile preferably employed. The electrode layer 114, 118 is also advantageous in terms of its ability to conduct electrons and oxygen ions to the desired locations.

The current collector layer 120 employed in this embodiment is lanthanum strontium cobaltite. This material is a perovskite and is an electrically conductive oxide with some oxygen ion conductivity which acts as the primary current collector on that side of the tile.

Other perovskites can be used, including lanthanum strontium manganite. Lanthanum strontium cobaltite is a superior electron and ionic conductive material. It can only be used in the present system due to the successful introduction of the interlayer. Lanthanum strontium cobaltite could not be employed previously as it is incompatible with the zirconia layer.

Lanthanum strontium cobaltite is produced as an ink by dispersing 30 g doped lanthanum strontium in 30 g methanol and 1.59 g polyvinyl pyrolydone. The materials are mixed by using a ball mill for 13 days. Following mixing the methanol is allowed to evaporate for 24 hours and then log terpiniol is added and stirred in. The cathode current collector layer 120 is applied onto the mixed oxide layer by screen printing to the desired depth and sintered at a temperature not greater than 1550° C.

The anode current collector layer 116 is formed from a conventional nickel/zirconia cermet previously used in fuel cells as the anode.

Given that this layer 116 acts as the primary current conductor rather than electrode its replacement with metal or alloy powder systems is possible.

Figure 4A:
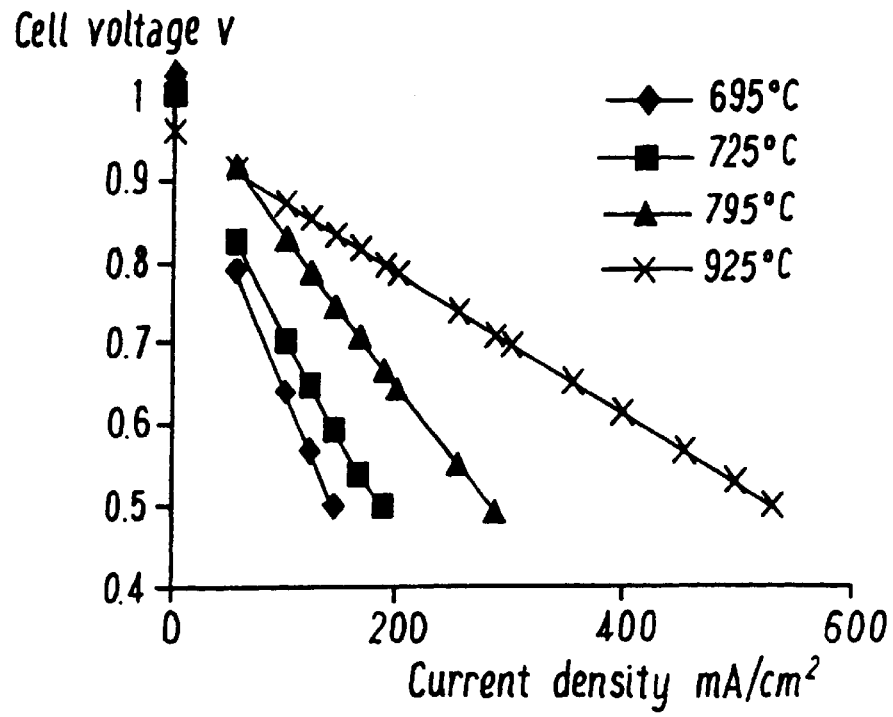
FIG. 4A is a graph illustrating the performance of an embodiment of the present invention.
Figure 4B:
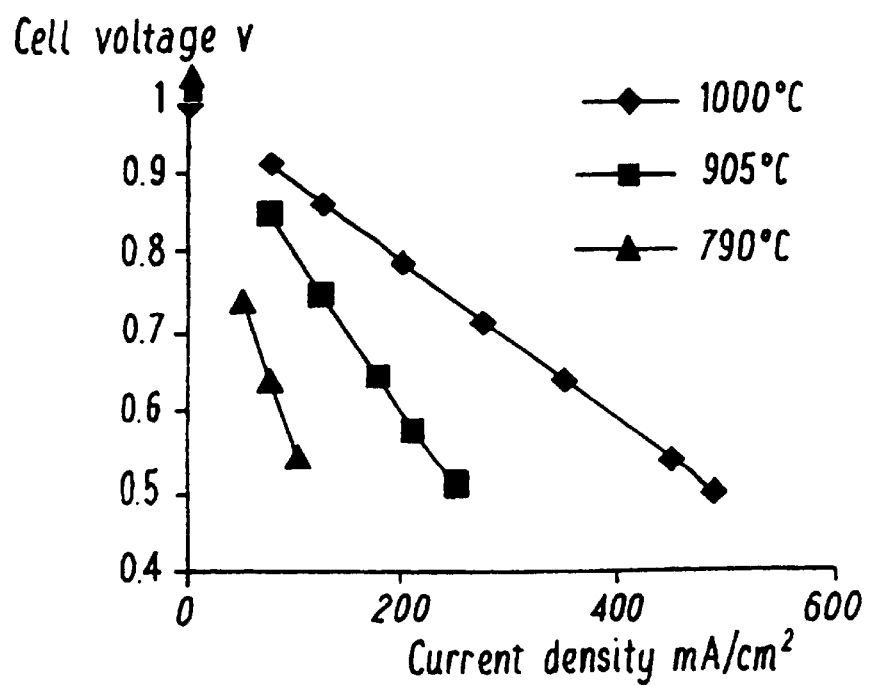
FIG. 4B is a graph illustrating the performance of an embodiment of the invention.

FIG. 4B illustrates performance, in terms of voltage against current density, for a typical prior art tile system. As can be seen the performance drops off considerably below 1000 degrees C.

FIG. 4A, however, clearly shows that a cell according to the present invention has all round improved performance. Performance at 725 degrees C. for the inventive material compares directly with performance at 905 degrees C. for the prior art.

The improved properties of the novel cell construction is also reflected in the activation energies. Prior art cells display activation energies of 80 kJ/mole as against 53 kJ/mole for the novel cell. This improvement has practical benefits as it means that lower temperature performance is enhanced.

The benefits obtained are thought to stem from two effects. The overall performance is thought to be improve by the increase in the effective area of the cell anode. The dependency on zirconia/nickel/gas triple points to provide reaction sites is eliminated. Any point on the mixed conducting surface will provide the necessary conditions for the electrochemical reaction to take place. The reduced activation energy suggests that the rate controlling process in the cell according to the invention is different from in the prior art. This may be associated with surface phenomena. The hypothesis suggested for the benefits are not intended to be limiting but merely a suggestion as to how the definite benefits might arise.

Re-sintering of the traditional Ni/Zirconia cermet and the deleterious effects may be avoided because the electrode is urania.

Tiles produced according to the present invention can be deployed in stacks or other system configurations well known in the art.

We claim:

1. A solid oxide fuel cell which comprises a layer of electrolyte material, a layer of a first electrode material to one side of the layer of electrolyte material, a layer of a second electrode material to the other side of the electrolyte material and a separator layer comprising a mixed conductor separating at least one electrode material from the electrolyte layer, the mixed conductor being comprised of urania and zirconia, the urania being provided as a solid solution with yttria.

2. A fuel cell as in claim 1 wherein one or more separator layers additionally comprise discrete zirconia.

3. A fuel cell as in claim 1 wherein a separator layer separates both electrode materials from the electrolyte material.

4. A fuel cell according to claim 3 wherein the materials of the two separator layers are the same.

5. A fuel cell according to claim 1 wherein the separator layer or layers provide the principal electrode function on the side of the fuel cell on which they are present and the electrode material layers mounted thereon provide the principal current collection function.

6. A fuel cell according to claim 1 in which the yttria forms 40 mol % of the solid solution with urania.

7. A fuel cell according to claim 1 in which a current collector/electrode material includes perovskite and/or a mixed nickel oxide/zirconia system and/or lanthanum strontium manganite.

8. A fuel cell according to claim 1 in which a current collector/electrode material includes or consists of lanthanum strontium cobaltite and the separator layer separates this current collector/electrode material from the electrolyte layer with which it is reactive.

9. A fuel cell according to claim 1 wherein the thickness of the separator layer/electrode layer or each of the underlying separator layers/electrode layers is less than 100 $\mu$m (microns).

10. A stack of fuel cells as in claim 1 wherein the electrode materials of adjacent cells are connected by electrically conducting material.

11. A method for forming a solid oxide fuel cell comprising applying a separator/electrode layer to an electrolyte tile and applying a current collector/electrode material layer to the separator/electrode layer, the separator/electrode layer being comprised of urania and zirconia the urania being provided as a solid solution with yttria.

12. A method according to claim 11 wherein the electrode layer is formed from a suspension of urania, yttria and a binding agent.

13. A method according to claim 12 wherein the urania and yttria as a solid solution is mixed with particulate zirconia to form the suspension.

14. A method according to claim 11 wherein a current collecting layer is provided with one or both electrode layers.

15. A method according to claim 14 wherein the electrode layer and/or the current collecting layer are screen printed onto the electrolyte tile.

16. A stack of fuel cells produced by the method of claim 11 wherein the electrode materials of adjacent cells are connected by electrically conducting material.

17. A solid oxide fuel cell which comprises a layer of electrolyte material, a layer of a first electrode material to one side of the layer of electrolyte material, a layer of a second electrode material to the other side of the layer of electrolyte material and a separator layer comprising a mixed conductor separating at least one electrode material from the layer of electrolyte material, the mixed conductor comprising urania as a binary solid solution with yttria, the yttria forming from about 40 mol % to about 60 mol % of the solid solution with urania.

* * * * *

UNITED STATES PATENT AND TRADEMARK OFFICE
CERTIFICATE OF CORRECTION

PATENT NO. : 6,013,386
DATED : Jan. 11, 2000
INVENTOR(S) : Robert Glyn Lewin; Vernon Barnett; Geoffrey Alan Wood It is certified that error appears in the above-identified patent and that said Letters Patent are hereby corrected as shown below:

Col. 4, line 49, after "invention;" delete "invention."

Col. 5, line 30, after "and" change "1a" to --1a--

Col. 5, line 34, change "-The" to --The--

Col. 6, line 15, after "hours." change "20" to --Twenty--

Col. 6, line 47, after "then" change "log" to --10 g--

Col. 6, line 57, after "than" change "electrode" to --an electrode,--

Col. 8, line 21, after "zirconia" insert a comma

Signed and Sealed this

Third Day of April, 2001

Attest:

NICHOLAS P. GODICI

Attesting Officer      Acting Director of the United States Patent and Trademark Office